US009729650B2

United States Patent
Westberg et al.

(10) Patent No.: US 9,729,650 B2
(45) Date of Patent: Aug. 8, 2017

(54) PROVIDING DATA TO A NETWORK TERMINAL

(75) Inventors: Lars Westberg, Enköping (SE); Attila Mihály, Dunakeszi (HU); Gábor Molnár, Békésszentandrás (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 406 days.

(21) Appl. No.: 14/400,539

(22) PCT Filed: May 18, 2012

(86) PCT No.: PCT/EP2012/059300
§ 371 (c)(1),
(2), (4) Date: Nov. 11, 2014

(87) PCT Pub. No.: WO2013/170903
PCT Pub. Date: Nov. 21, 2013

(65) Prior Publication Data
US 2015/0134783 A1    May 14, 2015

(51) Int. Cl.
*G06F 15/16* (2006.01)
*H04L 29/08* (2006.01)

(52) U.S. Cl.
CPC ........ *H04L 67/26* (2013.01); *H04L 29/08846* (2013.01); *H04L 67/02* (2013.01); *H04L 67/2847* (2013.01); *H04L 67/303* (2013.01); *H04L 67/2871* (2013.01)

(58) Field of Classification Search
CPC .............................................. G06F 17/30902
USPC ....................................................... 709/219
See application file for complete search history.

(56) References Cited

U.S. PATENT DOCUMENTS

| 6,366,947 B1 * | 4/2002 | Kavner ............. G06F 17/30902 707/E17.12 |
| 8,166,141 B1 * | 4/2012 | Van Horne, III ....... H04L 67/02 709/218 |
| 2007/0156384 A1 * | 7/2007 | Plunkett .................. H04L 67/02 703/23 |

(Continued)

OTHER PUBLICATIONS

International Search Report and Written Opinion, Application No. PCT/EP2012/059300, dated Feb. 22, 2013, 10 pages.

(Continued)

*Primary Examiner* — Hamza Algibhah
(74) *Attorney, Agent, or Firm* — Nicholson De Vos Webster & Elliott LLP

(57) ABSTRACT

A method and apparatus for providing data to a network terminal. A network node receives information relating to a first instance of a client running at the network terminal. Using the information, the network node concurrently runs a second instance of the client that emulates the first instance. Using the second instance, the network node generates a request for data required by the first instance. Before receiving a request for data generated by the first instance, the network node sends the request for data required by the first instance to a remote server and receives a response that includes the required data. The required data is then sent to the network terminal. The advantage of this is that the request for data required is generated before the network node receives a request from the network terminal. This allows the request to be handled more quickly.

16 Claims, 7 Drawing Sheets

(56) References Cited

U.S. PATENT DOCUMENTS

2008/0052366 A1* 2/2008 Olsen .................... G06F 1/3209
709/206
2011/0015917 A1* 1/2011 Wang ...................... G06F 9/455
703/23
2011/0289582 A1* 11/2011 Kejriwal ............... G06F 21/566
726/22

OTHER PUBLICATIONS

Antti Koivisto, "Optimizing Page Loading in the Web Browser," Mar. 23, 2008, 6 pages, Surfin' Safari, downloaded from https://www.webkit.org/blog/166/optimizing-page-loading-in-web-browser/ on Nov. 10, 2014.
International Preliminary Report on Patentability for Application No. PCT/EP2012/059300, mailed Nov. 27, 2014, 7 pages.

* cited by examiner

PROVIDING DATA TO A NETWORK TERMINAL

CROSS-REFERENCE TO RELATED APPLICATIONS

This application is a National stage of International Application No. PCT/EP2012/059300, filed May 18, 2012, which is hereby incorporated by reference.

TECHNICAL FIELD

The invention relates to providing data to a network terminal.

BACKGROUND

Lengthy download times experienced when using a mobile network, compared with using a fixed DSL network, for example, are known to reduce a user's quality of experience (QoE). The user, when comparing the mobile network performance with a fixed broadband network performance, will often observe that the download performance is slower over the mobile network. FIG. 1 plots the measured performance for loading a web page over a fixed DSL network, and illustrates the dependency of download speed with bandwidth limit and latency. It can be seen that networks with a higher latency, a feature common in mobile networks, do not efficiently utilize connections with ever increasing bandwidth.

One proposal to address this problem is to predict the required data content, and to push the required data content to a client before the client requests it. Using the same evaluation as in FIG. 1, FIG. 2 highlights the advantage of using such a method. In the context of the client being a web browser to access an Internet website, prediction may be based on parameters such as the user's browsing history, or information obtained from the browsing habits of other users who have accessed that web site.

A problem with using a predictive method stems from the dynamic nature of modern web content. The predictive technique works reasonably well with a static webs site. However, an increasing number of web sites feature dynamic content. For example, a web portal may draw in information from many different web sites, and update this information at differing time intervals depending on the source of the information. A weather application displayed on the web portal may be updated hourly, for example, whereas a breaking news section may be updated every few minutes. Furthermore, the rate and/or time at which such data is updated may depend on the type of web browser the user is using, or any number of parameters relating to the network terminal on which the web browser is running. Furthermore, information requested by the web browser may be generated randomly, as can sometimes be the case when displaying advertisements on web pages. Unlike static web content, dynamic information as described cannot simply be cached and/or pushed to a client because the required information cannot be easily predicted. Furthermore, as web page sophistication improves, the proportional split between dynamic and static web content is likely to increase.

Some specific web portals may be designed to offer dynamical information before it is requested by the client, but this would require an optimised design and so is not very common. It would also only be available on that specific web portal, and so does nothing to improve the mobile browser situation generally.

A simple solution that a network operator could employ, in order to enhance the QoE for a user, is to increase the bandwidth available to the user. Practically, this is a costly exercise, and as can be seen in FIG. 1, would still result in high latency network connections that do not make efficient use of the improved bandwidth.

Increasing the cache size of a network in order to cache web pages is a further solution to enhance the quality of experience for the user, but such caching techniques only improve the performance for loading static objects.

There has been a general shift towards processing data in the Cloud at data-centres. These data-centres possess vast CPU and memory resources. An example utilising this type of model is the Amazon Silk browser, in which some of the processing is done at a network terminal, and the rest is done at an Amazon data-centre. Users accessing the internet in this way become dependant on a given data-centre, which may be physically located a great distance from the user. This can further reduce the QoE for the user.

SUMMARY

It is an object of the invention to decease the time taken to download required data from a remote server to a network terminal. This may be achieved by downloading the same required data to a network node, the network node having a faster connection to the remote server than the network terminal's connection to the remote server, and then sending the required data from the network node on towards the network terminal. According to a first aspect, there is provided a method for providing data to a network terminal. A network node receives information relating to a first instance of a client running at the network terminal. Using the information, the network node concurrently runs a second instance of the client, the second instance of the client emulating the first instance of the client. Using the second instance of the client, the network node generates a request for data required by the first instance of the client. Before receiving a request for data generated by the first instance of the client, the network node sends the request for data required by the first instance of the client to a remote server and receives a response that includes the required data. The required data is then sent to the network terminal. The advantage of this is that the second instance of the client generates a request for data required by the first instance of the client before the network node receives a request from the network terminal. This allows the request to be sent more quickly, for example using a fast connection, to the remote server, and the required data can be provided to the network terminal more quickly than if the request had originated from the network terminal.

As an option, the information relating to the first instance of the client is included in an HTTP request sent by the first instance of the client towards the remote server and/or an HTTP reply sent by the remote server towards the first instance of the client.

As an option, the network node runs a third instance of the client that emulates the first instance of the client running on the network terminal. Before sending the request for data required by the first instance of the client to the remote server, the network node determines that the request for data generated by the second instance of the client corresponds to a request for data generated by the third instance of the client. The advantage of this is that some websites are dynamic and use random numbers, tie stamps, or other information in the request. In such a case, where the requests for data required by the second and third instances correspond to each other, it is reasonable to assume that they also correspond to a request for data required by the first instance of the client. In the event that the second and third client generated requests do not correspond to each other, the second and third client generated requests are discarded.

As an option, the required data is pushed towards the network terminal. Alternatively, the network node stores the required data and subsequently receives a request for the required data from the first instance of the client running at the network terminal. In response to receiving the request for the required data from the first instance of the client running at the network terminal, the network node sends the required data towards the client running at the network terminal.

The information relating to the first instance of the client running at the network terminal optionally comprises information relating to any of an Operating System, the network terminal, a web browser, and a website, or any other information that will allow the second or third instances of the client to emulate the first instance of the client.

As an option, the first instance of the client is a web browser.

As a further option, the request for data required by any instance of the client is an HTTP request.

The required data is optionally sent towards the network terminal using a SPDY tunnel.

As an option, a connection between the network node and the remote server allows for a faster transfer of data than a connection between the network terminal and the remote server.

According to a second aspect, there is provided a network node for providing data to a network terminal. The network node is provided with a first receiver for receiving information relating to a first instance of a client running at the network terminal. A processor is provided for concurrently running a second instance of the client, the second instance of the client emulating the first instance of the client running on the network terminal. The processor is further arranged to generate a request for data required by the first instance of the client using the second instance of the client. A first transmitter is provided for, prior to receiving a request for data generated by the first instance of the client, sending the request for data required by the first instance of the client to a remote server. A second receiver is provided for receiving from the remote server a response, the response including the required data. A second transmitter is provided for sending the required data to the network terminal.

As an option, the network node is further provided with a second processor arranged to run a third instance of the client. The third instance of the client emulates the first instance of the client running on the network terminal. As a further option, the network node is provided with a third processor arranged to determine that the request for data generated by the processor corresponds to a request for data generated by the second processor. This ensures that where the request may be dynamically altered by factors such as random numbers, the requests generated by the second and third instances of the client correctly anticipate the data required by the first instance of the client.

As an option, the network node is arranged to send the required data via a SPDY tunnel to the network terminal.

As an option, a connection between the network node and the remote server provides a faster transfer of data than a connection between the network terminal and the remote server.

According to a third aspect, there is provided a computer program, comprising computer readable code which, when run on a network node, causes the network node to perform the method as described above in the first aspect.

According to a fourth aspect, there is provided a computer program product comprising a computer readable medium and a computer program as described above in the third aspect, wherein the computer program is stored on the computer readable medium.

DETAILED DESCRIPTION

The invention provides an improved QoE for a user by decreasing the time it takes for a network terminal, such as a user terminal, to download data from a remote server. The network terminal may be, for example, a mobile telephone, laptop or PC. There are an increasing number of web pages that employ dynamic data, wherein the dynamic data can be dependant on a range of factors, some of which may include details of the network terminal used to access the website, or a client such as a web browser running on the network terminal. It is therefore difficult for a network to know what data a client will require prior to receiving a request. In order to account for the increasing amount of dynamic data, a network node is provided that runs a second instance of the user client, emulating a first instance of the client running on the network terminal. The network node can be, for example, a Radio Network Controller (RNC) or a Public Data Network (PDN) gateway. By emulating the first instance of the client running on the network terminal, the second instance of the client is able to mimic the behaviour of the original client. When the second instance of the client sends a request for required data, it is likely that the first instance of the client also requires this data. The network node will typically be able to download data from the remote server in a shorter time frame than the network terminal would be able to download data from the remote server. In other words the connection between the network node and the remote server is faster than the connection between the network terminal and the network node. This may be due to a range of factors, such as the connection between the network node and the remote server having a greater bandwidth or lower latency.

The network node can then begin downloading, and storing, the required data before receiving a request by the network terminal for the required data. When the network node receives the request from the first instance of the client, it determines if the data has been downloaded, or partially downloaded. If so, the data can be sent to the first instance of the client. The second instance of client may be executed in a Cloud, enabling scalability for many simulations of clients.

Figure 1:
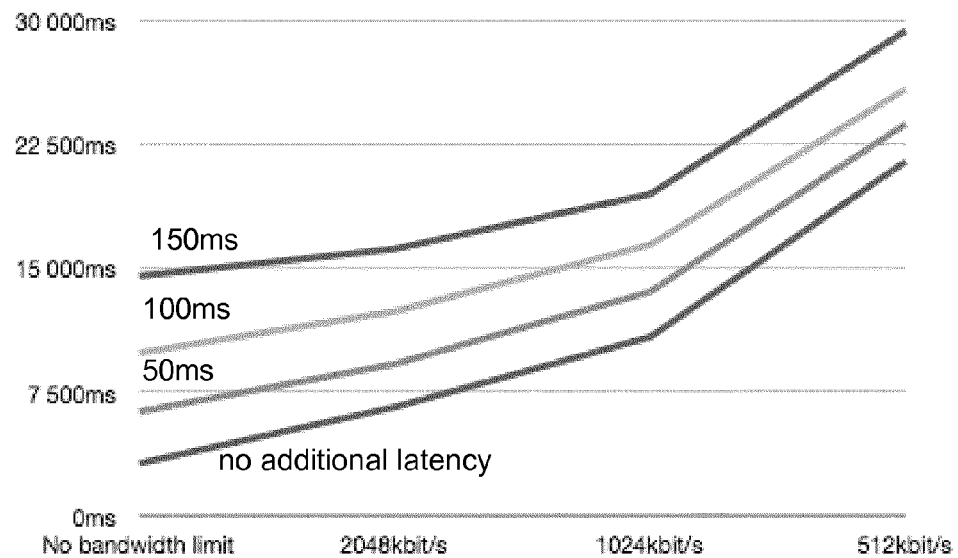
FIG. 1 is a graph showing the utilisation of network connections with differing latencies.
Figure 2:
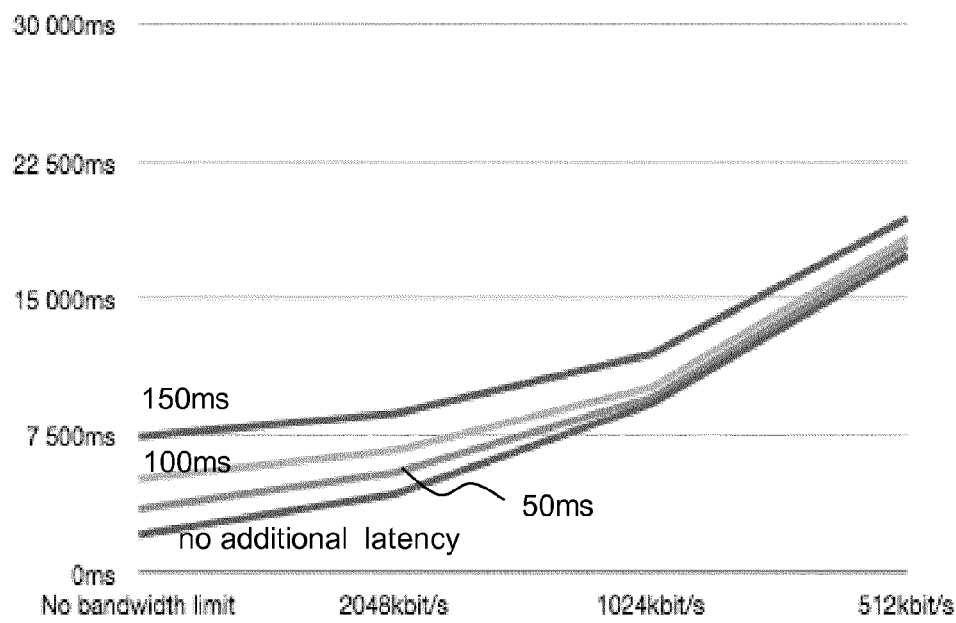
FIG. 2 is a graph showing the utilisation of network connections with differing latencies where data is pushed to a client.
Figure 3:
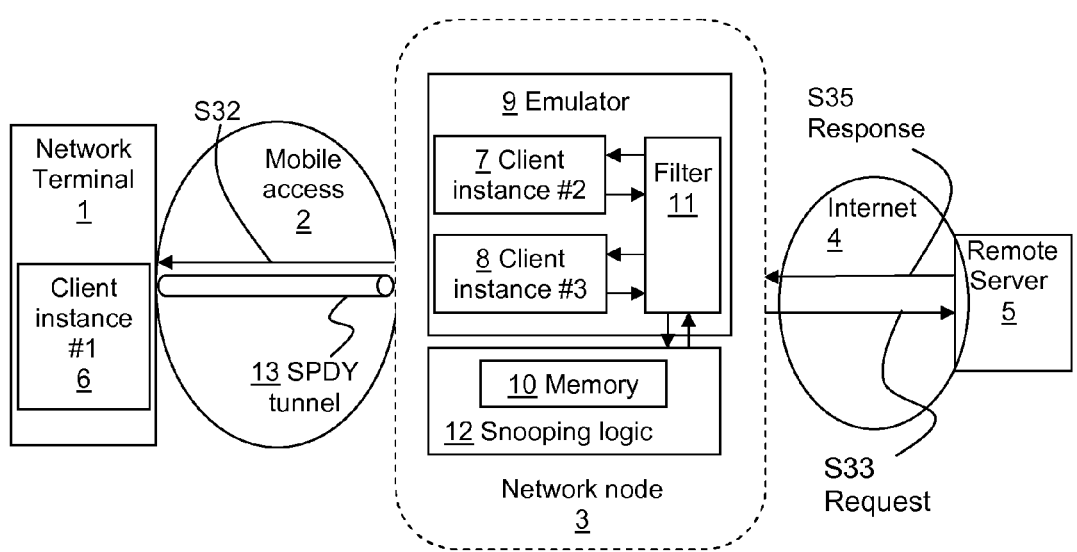
FIG. 3 illustrates schematically in a block diagram a network architecture according to an embodiment of the present invention.

FIG. 3 illustrates schematically in a block diagram a network architecture according to an embodiment of the present invention. The network architecture includes a network terminal 1, connected via a mobile access network 2 to a network node 3. The network node 3 is connected via an Internet 4 to a remote server 5. The network terminal 1 runs a first instance of a client 6 such as a web browser. The client 6 sends a request for data towards the remote server 5. The network node 3 runs a second 7 and third instance 8 of the first instance of the client 6 at an emulator 9, stores the request in a memory 10 and forwards the request on towards the remote server 5. Subsequent requests from the second 7 and third 8 instances are checked at a filter 11 and one of the subsequent requests is sent to the snooping logic 12 only if both subsequent requests are identical.

The snooping logic 12 obtains a subsequent request from the filter 11, and forwards it towards the remote server 5. The subsequent request corresponds to a request made by the first instance of the client 6, as the second 7 and third 8 instances of the client emulate the first instance of the client 6. The remote server 5 replies with data requested by the request. The reply is stored in the memory 10. The reply may be pushed to the network terminal 1 via a SPDY tunnel 13.

Figure 4:
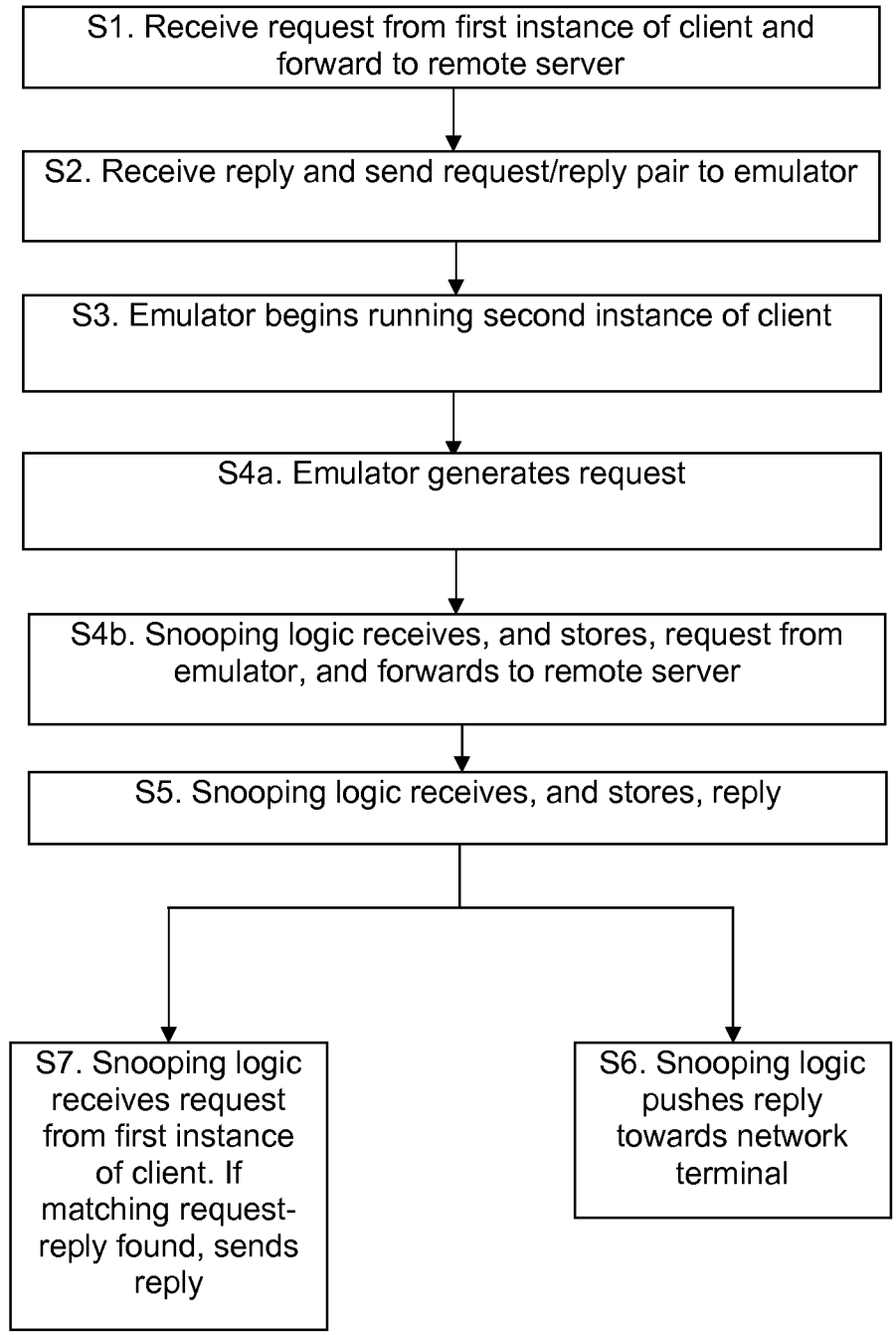
FIG. 4 is a flow diagram illustrating steps of an embodiment of the invention.

FIG. 4 is a flow diagram illustrating an example of the network node 1 obtaining the required data before receiving a request from the network terminal 3 for the data in accordance with the first embodiment of the present invention. The following embodiments assume that the request sent by the network terminal 1 is an HTTP request. The steps are performed as follows:

S1. At a snooping logic 12 running on at a network node 2 such as an RNC or PDN gateway, information is received from the first instance of the client 6. This information may be an HTTP request for an HTML page, or some other way of providing information relating to the first instance of the client 6, such as the type of web browser, the operating system, the web site currently being viewed and so on. The snooping logic 12 stores the HTTP request in a memory 10, and then forwards the HTTP request on towards the remote server 5.

S2. The snooping logic 12 receives an HTTP reply from the remote server 5, identifies the HTML page, forwards the HTTP reply towards the network terminal 1, and sends the HTTP request-reply pair to the emulator 9. The information contained in the request/reply pair allows the emulator to establish one or more "shadow" versions of the first instance of the client 6 that correspond to the first instance of the client 6.

S3. The emulator 9 extracts cookies as well as information about the network terminal 1 and the first instance of the client 6, and begins running a second instance 7 of the client, emulating the first instance 6.

S4a. The second instance of the client 7 generates a further request for data. As the second instance 7 of the client corresponds to the first instance of the client 6, it will make the same request for data as the first instance of the client 6.

S4b. The second instance subsequently sends the generated further request to the snooping logic 12, which stores the further request in the memory 10 and forwards it towards the remote server 5.

S5. The snooping logic 12 receives and stores a further HTTP reply in the memory 10, and associates the further HTTP reply to the corresponding further HTTP request.

S6. In an optional embodiment, the snooping logic 12 may push the further HTTP reply towards the network terminal 1 running the first instance of the client 6 via a SPDY tunnel 13. The further HTTP reply may then be stored at a cache at the network terminal 1 for subsequent use by the first instance of the client 6.

S7. In an alternative embodiment, a subsequent HTTP request is received at the snooping logic 12 from the first instance of the client 6. The snooping logic 12 checks the memory 10, and if a matching HTTP request-reply pair is found, forwards the HTTP reply towards the network terminal 1.

Figure 5:
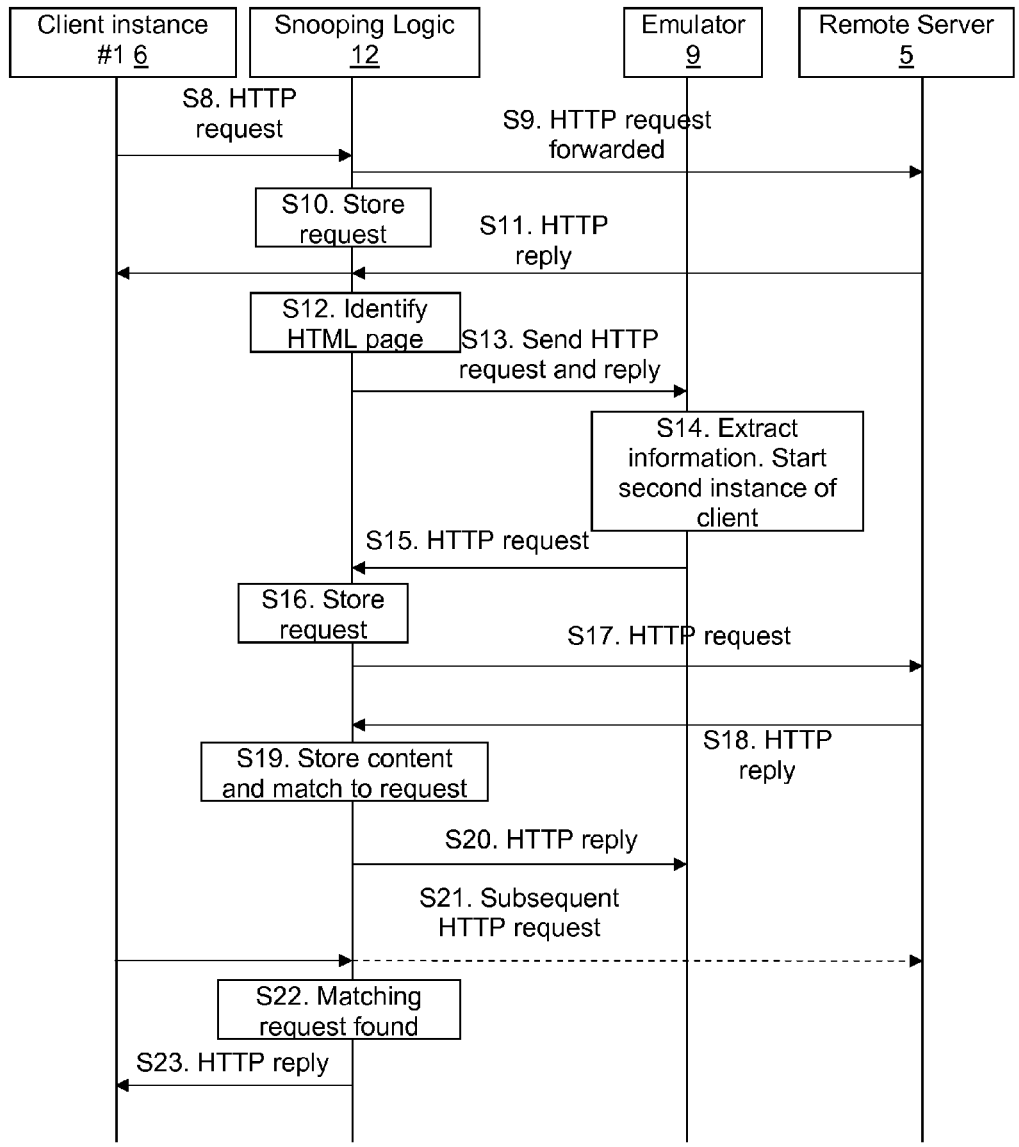
FIG. 5 is a signalling diagram illustrating an embodiment of the invention.

A signalling diagram in accordance with the first embodiment of the present invention is shown in FIG. 5. The steps are outlined below.

S8. The HTTP request is sent from a first instance of the client 6 towards the remote server 5 via the snooping logic 12.

S9. The snooping logic 12 forwards the HTTP request towards the remote server 5.

S10. The snooping logic 12 stores the HTTP request.

S11. The HTTP reply is sent from the remote server 5 to the first instance of the client 6, via the snooping logic 12.

S12. The snooping logic 12 analyses the HTTP reply, and identifies the HTML page requested in the HTTP request.

S13. The snooping logic 12 sends the HTTP reply, along with the original request towards the emulator 9.

S14. Using information comprising information about the network terminal 1 and the first instance of the client 6, the emulator 9 begins running a second instance 7, emulating the first instance 6.

S15. A further HTTP request from the second instance of the client 7 is forwarded towards the snooping logic 12.

S16. The snooping logic 12 stores the further HTTP request.

S17. The further HTTP request is sent towards the remote server 5.

S18. The remote server 5 sends a further HTTP reply.

S19. The snooping logic 12 stores the further HTTP reply, and associates it with the corresponding further HTTP request.

S20. The further HTTP reply may be sent to the emulator 9 for further processing, for example the further HTTP reply may contain an embedded HTML page, style-sheet, or script.

S21. A subsequent HTTP request is received at the snooping logic 12 by the first instance of the client 6.

S22. The snooping logic 12 determines whether the HTTP request corresponds with a matching HTML request-reply pair. If there is no matching request found that has previously been obtained by sending a request from the second instance of the client 7, then the HTTP request is forwarded towards the remote server 5 as normal, and shown in the dotted line adjacent to step S21.

S23. If a matching HTTP request-reply pair is found, the snooping logic 12 forwards the further HTTP reply towards the first instance of the client 6 at the network terminal 1.

By running a second instance of the client 7 at the network node 3, data that will be required by the first instance of the client 6 can be obtained by the network node 3 much more quickly than it could be obtained by the network terminal 1. This allows the data required by the first instance of the client 6 to be provided to the network terminal 1 much more quickly than would otherwise be possible, thereby improving the QoE for the user.

In some circumstances, it is advantageous to run further instances of the first instance of the client 6 at the network node 3. A general characteristic of dynamic data for a web browser is that a script may use client or network terminal state information to determine what data is to be downloaded. This information could be stored in a browser's LocalStorage or cache, or it may depend upon a parameter such as a system time of the network terminal. Scripts may also use a random generator in order to determine what data to request. This feature is sometimes used in advertisement scripts. The presence of such scripts would result in data being downloaded to the network node 3 that would not subsequently be requested by the first instance of the client 6. In order to address this, a further embodiment is provided in which the network node 3 runs a third instance of the client 8 in addition to the second instance of the client 7. Each instance emulates the first instance of the client 6 running on the network terminal 1. The second 7 and third 8 instances of the client may have differing parameters, such as a different system time, or other network terminal state parameters that are stored locally. Random numbers may also be used to generate requests. A filter 11 is applied by the network node 3 that forwards only identical requests from the second 7 and third 8 instances, for example requests requesting the same resource with the same header. If the requests differ, it is likely that the request made by the first instance of the client 6 will also differ, because each request uses different data. In this case, the first instance 6 downloads the required data from the remote server 5 as normal, and the requests made by the second instance of the client 7 and the third instance of the client 8 are discarded.

Figure 6:
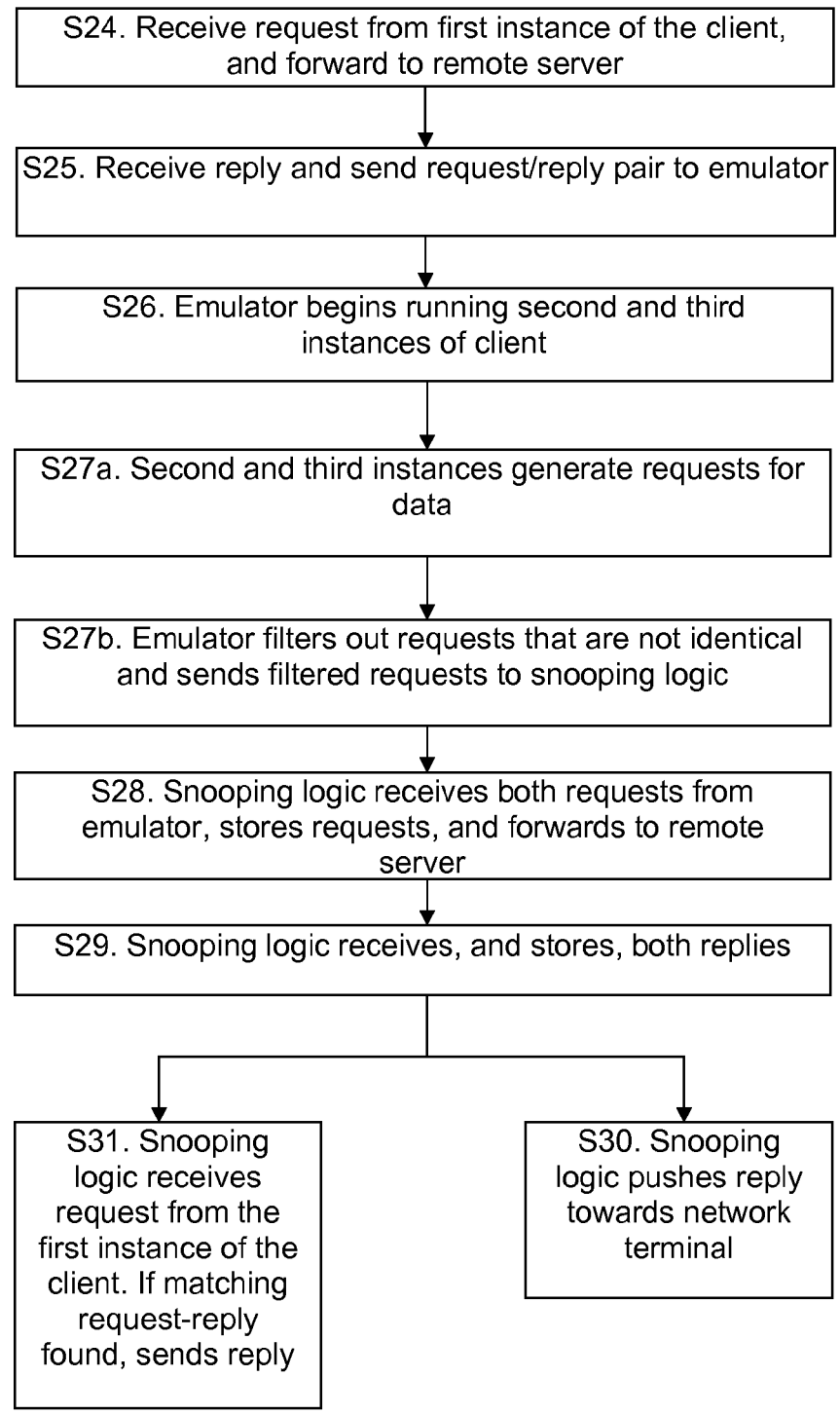
FIG. 6 is a flow diagram illustrating a further embodiment of the invention.

FIG. 6 is a flow diagram illustrating an example of the network node 3 obtaining the required data before receiving a request from the first instance of the client 6 for the required data. This is in accordance with the further embodiment, wherein two instances 7, 8 of the first client 6 are run at the emulator 9. The steps are performed as follows:

S24. At a snooping logic function 12 running at the network node 3, an HTTP request is received from the first instance of a client 6 running on the network terminal 1. The snooping logic 12 stores the HTTP request in the memory 10, and then forwards the HTTP request on towards the remote server 5.

S25. The snooping logic 12 receives an HTTP reply from the remote server 5, identifies the HTML page, forwards the HTTP reply towards the first instance of the client 6, and sends the HTTP request-reply pair to the emulator 9. The information contained in the request/reply pair allows the emulator to establish further instances of the first instance of the client 6.

S26. The emulator 9 extracts cookies and information about the network terminal 1 from the request/reply pair, and begins running a second 7 and third 8 instance of the client, both of which substantially emulate the first instance 6. Differing parameters may be used in the running of the second 7 and third 8 instances from that of the first instance 6, or from each other, for example using a different system time.

S27a. The second 7 and third 8 instances of the client generate further requests for data that anticipate a request for data that the first instance of the client requires.

S27b. Using a filter 11, the emulator 9 then filters out generated further requests from each of the second 7 and third 8 instances that are not identical, since such requests will probably also differ from what the first instance 6 will subsequently request. Where requests from the second 7 and third 8 instances of the client are identical, the emulator 9 sends one of the requests to the snooping logic 12.

S28. The snooping logic 12 receives, and stores in the memory 10, both filtered requests from the emulator 9, and forwards one of the further requests towards the remote server 5.

S29. The snooping logic 12 receives and stores a further HTTP reply in the memory, sent from the remote server 5. The snooping logic 12 associates the further HTTP reply with the corresponding further HTTP request.

S30. In an optional embodiment, the snooping logic 12 pushes the further HTTP reply towards the network terminal 1 via a SPDY tunnel 13. The further HTTP reply may then be stored at a cache at the network terminal 1 for subsequent use by the first instance of the client 6.

S31. In an alternative embodiment, a subsequent HTTP request is received at the snooping logic 12 from the first instance 6. The snooping logic 12 checks the memory 10, and if a matching HTTP request-reply pair is found, forwards the HTTP reply towards the network terminal 1.

Figure 7:
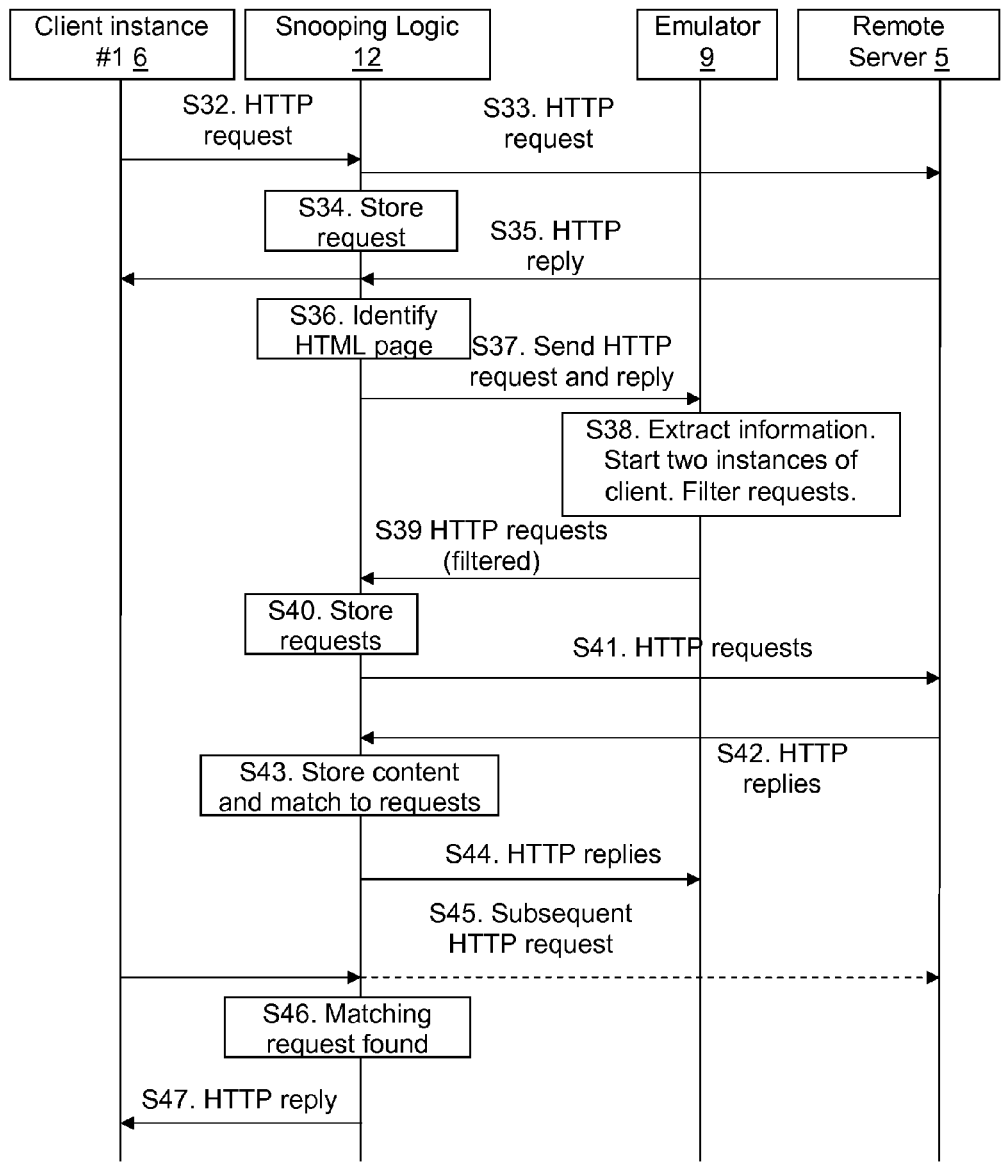
FIG. 7 is a signalling diagram illustrating the further embodiment of the invention.

A signalling diagram in accordance with the second embodiment of the present invention is shown in FIG. 7. The steps are outlined below.

S32. An HTTP request is sent from a first instance of the client 6 towards the remote server 5 via the snooping logic 12.

S33. The snooping logic 12 forwards the HTTP request towards the remote server 5.

S34. The snooping logic 12 stores the HTTP request.

S35. An HTTP reply is sent from the remote server 5 to the first instance of the client 6, via the snooping logic 12.

S36. The snooping logic 12 analyses the HTTP reply, and identifies the HTML page requested.

S37. The snooping logic 12 sends the HTTP reply, along with the original request towards the emulator 9.

S38. Using information about the first instance of the client 6, the emulator 9 begins running a second 7 and third 8 instance of the client, both of which substantially emulate the first instance of the client 6. Differing parameters may be used in the running of second 7 and third 8 instances from that of the first instance of the client 6, for example a different system time. The second 7 and third 8 instances of the client may be running different parameters from each other. A filter 11 filters out requests that are not identical.

S39. Filtered further HTTP requests from the second 7 and third 8 instances of the client are forwarded towards the snooping logic 12.

S40. The snooping logic 12 stores the further HTTP requests from the second 7 and third 8 instances of the client.

S41. The further HTTP request is sent towards the remote server 5.

S42. The remote server 5 sends a further HTTP reply.

S43. The snooping logic 12 stores the further HTTP reply, and matches them to the corresponding further HTTP requests.

S44. The further HTTP reply may be sent to the emulator 9 for further processing, for example the further HTTP replies may contain embedded HTML pages, style-sheets, or scripts.

S45. A subsequent HTTP request is received at the snooping logic 12 from the first instance of the client 6.

S46. The snooping logic 12 determines whether the subsequent HTTP request corresponds with a matching HTML request-reply pair. If there is no matching request found that has previously been obtained by sending a request from the second or third instance of the client 7, 8, then the HTTP request is forwarded towards the remote server 5 as normal, and shown in the dotted line adjacent to step S45.

S47. If a matching HTTP request-reply pair is found, the snooping logic 12 forwards the relevant HTTP reply towards the network terminal 1.

Figure 8:
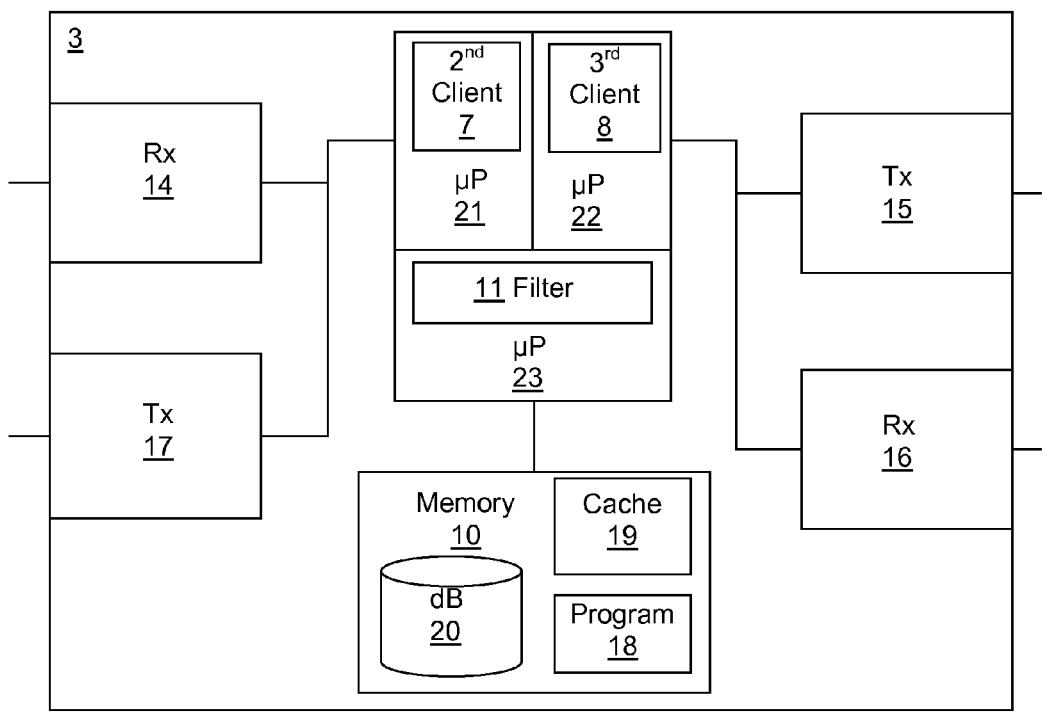
FIG. 8 illustrates schematically in a block diagram an exemplary embodiment of a network node.

FIG. 8 illustrates schematically an example of a network node 3 for implementing the present invention in accordance with the methods described above. The network node 3 can be implemented as a combination of computer hardware and software. The network node 3 comprises a memory 10, a receiver 14, a transmitter 15, a further receiver 16, a further transmitter 17, a program 18, a cache 19, a database 20, a first processor 21, a second processor 22, and a third processor 23. The receiver 14 receives a request from the first instance of a client 6 running on the network terminal 1. The first processor 21 begins running a second instance 7 of the client running on the network terminal 1, and the second processor 22 begins running the third instance 8 of the client running on the network terminal 1. Both the second instance 7 and the third instance 8 may be executed in an environment with differing parameters, such as system time. A filter 11 running on the third processor 23 filters out requests from the second and third instances 7, 8 that are not identical. Requests that are identical are sent from the transmitter 15 towards the remote server 5. The further receiver 16 receives a reply to the request, and the reply is stored along with the corresponding request in the cache 19. Subsequently, the receiver 14 receives a request from the first instance of the client 6 and if a request-reply pair is found in the cache 19 stored at the memory 9, the further transmitter 17 sends the reply towards the network terminal 1.

FIG. 8 illustrates three processors 21, 22, 23. It will be appreciated that these may be embodied in a single processor or a combination of other processors. Similarly, separate transmitters 15, 17 and receivers 14, 16 are illustrated. It will be appreciated that this may be embodied as a single transmitter and receiver, or as one or more transceivers. The cache 19, program 18 and database 20 are shown as stored in a computer readable medium in the form of a memory 10. It will be appreciated that these may be stored in one or more separate memories.

The database 20 is provided that stores rules to be applied to requests and replies sent between the remote server 5 and the network node 1. The program 18, when run by one or more of the processors 21, 22, 23, causes the processors to behave as described above.

It will be appreciated by the person of skill in the art that various modifications may be made to the above described embodiment without departing from the scope of the present invention. For example, the functions of the network node are described as being embodied at a single node, but it will be appreciated that different functions may be provided at different network nodes. Furthermore, it will be appreciated that a similar method can be applied to automatically generated uploads, in which the emulator generates upload data that can be sent to the remote server more quickly than it could be sent from the network terminal.

The following acronyms have been used in the above description:
DSL Digital Subscriber Line
HTML HyperText Markup Language
HTTP HyperText Transfer Protocol
PDN Packet Data Network
QoE Quality of Experience
RNC Radio Network Controller
UE User Equipment

The invention claimed is:

1. A method for providing data to a network terminal, the method comprising, at a network node:
receiving information relating to a first instance of a client running at the network terminal;
using the information, concurrently running a second instance of the client, the second instance of the client emulating the first instance of the client;
using the second instance of the client, generating a request for data required by the first instance of the client;
prior to receiving a request for data generated by the first instance of the client, sending the request for data required by the first instance of the client to a remote server;
receiving from the remote server a response, the response including the required data;
sending the required data to the network terminal;
running a third instance of the client, the third instance of the client emulating the first instance of the client running on the network terminal; and
prior to sending the request for data required by the first instance of the client to the remote server, determining that the request for data required by the first instance of the client corresponds to a request for data generated by the third instance of the client.

2. The method according to claim 1, wherein the information relating to the first instance of the client is included in any of a HyperText Transfer Protocol (HTTP) request sent by the first instance of the client towards the remote server and an HTTP reply sent by the remote server towards the first instance of the client.

3. The method as claimed in claim 1, wherein the required data is pushed towards the network terminal.

4. The method as claimed in claim 1, further comprising at the network node:
storing the required data;
receiving a request for the required data from the first instance of the client running at the network terminal; and
in response to receiving the request for the required data from the first instance of the client running at the network terminal, sending the required data towards the client running at the network terminal.

5. The method according to claim 1, wherein the information relating to the first instance of the client running at the network terminal comprises information relating to any of an Operating System, the network terminal, a web browser, and a website.

6. The method according to claim 1, wherein the first instance of the client is a web browser.

7. The method as claimed in claim 1, wherein the requests for data required by any instance of the client are HyperText Transfer Protocol (HTTP) requests.

8. The method as claimed in claim 1, wherein the required data is sent towards the network terminal using a SPDY tunnel.

9. The method as claimed in claim 1, wherein a connection between the network node and the remote server allows for a faster transfer of data than a connection between the network terminal and the remote server.

10. A network node for providing data to a network terminal, the network node comprising:
a first receiver for receiving information relating to a first instance of a client running at the network terminal;
a processor for concurrently running a second instance of the client, the second instance of the client emulating the first instance of the client running on the network terminal, the processor arranged to generate a request for data required by the first instance of the client using the second instance of the client;

a first transmitter for, prior to receiving a request for data generated by the first instance of the client, sending the request for data required by the first instance of the client to a remote server;

a second receiver for receiving from the remote server a response, the response including the required data;

a second transmitter for sending the required data to the network terminal;

second processor, arranged to run a third instance of the client, the third instance of the client emulating the first instance of the client running on the network terminal; and a third processor arranged to determine that the request for data generated by the processor corresponds to a request for data generated by the second processor.

11. The network node as claimed in claim 10, wherein the network node is arranged to send the required data via a SPDY tunnel to the network terminal.

12. The network node as claimed in claim 10, wherein a connection between the network node and the remote server provides a faster transfer of data than a connection between the network terminal and the remote server.

13. A non-transitory machine-readable storage medium having instructions stored therein, which when executed by a processor, causes the processor to perform the following operations:

receiving information relating to a first instance of a client running at a network terminal;

using the information, concurrently running a second instance of the client, the second instance of the client emulating the first instance of the client;

using the second instance of the client, generating a request for data required by the first instance of the client;

prior to receiving a request for data generated by the first instance of the client, sending the request for data required by the first instance of the client to a remote server;

receiving from the remote server a response, the response including the required data;

sending the required data to the network terminal;

running a third instance of the client, the third instance of the client emulating the first instance of the client running on the network terminal; and prior to sending the request for data required by the first instance of the client to the remote server, determining that the request for data required by the first instance of the client corresponds to a request for data generated by the third instance of the client.

14. The non-transitory machine-readable storage medium of claim 13, wherein the information relating to the first instance of the client is included in any of a HyperText Transfer Protocol (HTTP) request sent by the first instance of the client towards the remote server and an HTTP reply sent by the remote server towards the first instance of the client.

15. The non-transitory machine-readable storage medium of claim 13, wherein the required data is pushed towards the network terminal.

16. The non-transitory machine-readable storage medium of claim 13, the operations further comprising:

storing the required data;

receiving a request for the required data from the first instance of the client running at the network terminal; and in response to receiving the request for the required data from the first instance of the client running at the network terminal, sending the required data towards the client running at the network terminal.

\* \* \* \* \*